United States Patent [11] 3,576,521

[72] Inventor Daniel Silverman
 5969 S. Birmingham St., Tulsa, Okla. 74105
[21] Appl. No. 646,537
[22] Filed June 16, 1967
[45] Patented Apr. 27, 1971
 Continuation-in-part of application Ser. No. 512,689, Dec. 9, 1965, now Patent No. 3,400,363.

[54] METHOD AND APPARATUS FOR DETECTING COHERENT ELASTIC WAVE ENERGY
 34 Claims, 14 Drawing Figs.
[52] U.S. Cl. ................................................. 340/3,
 340/5, 73/67.7
[51] Int. Cl. ..................................................... G01s 9/66
[50] Field of Search ............................................ 340/3, 4, 5,
 5 (H), 5 (T); 181/0.5 (A), 0.5 (B); 343/18 (B); 73/67.5—67.9

[56] References Cited
 UNITED STATES PATENTS
 2,525,873 10/1950 DeLano, Jr. .................. 73/67
 2,832,214 4/1958 Trommler ..................... 73/67.6
 3,097,522 7/1963 Weller, Jr. .................... 73/67.6
 3,316,551 4/1967 Feder et al. ................... 343/18
 3,434,339 3/1969 Stetson et al. ................. 73/67.6
 OTHER REFERENCES
 Mueller et al., Applied Physics Letters, Vol. 9, No. 9, Nov. 1, 1966, pp. 328— 329.

Primary Examiner—Richard A. Farley

ABSTRACT: In the mapping of elastic wave fields in fluids, such as might be involved in recording a sonic hologram in a liquid medium overlying a three-dimensional sonic reflecting surface immersed in the liquid, it is necessary to provide means for measuring the intensity of elastic wave energy at a plurality of points in a matrix of points on a receiving surface. This invention is directed to the use of a simple, cheap means of indicating and/or recording the intensity of elastic wave energy at a plurality of points in such a medium.

This invention involves the preplacement or predistribution of a material, called a detecting or receiving material, over an area comprising many wavelength in each of two perpendicular directions. At each point of placement of the detecting material, the state of distribution of the material is a function of the intensity of coherent elastic wave energy in the steady state wave pattern at that point. Thus, the intensity of elastic wave energy at each point can be determined from the state of distribution of the material after the initiation of irradiation of those points with elastic wave energy.

The material can be finely divided solids, powders, encapsulated liquids, or liquid droplets immiscible with the liquid of the medium. The material can also be a liquid miscible with the liquid of the medium, but differing in some measurable characteristic, such as color, conductivity, etc. The material can also be a fluid in dynamic motion in the fluid of the medium, the characteristic motion being a function of the intensity of wave energy at the point. In each case, the state of distribution of the material will vary from the predistribution due to the particle motion of the medium during the irradiation of the point by the elastic wave field, and this variation will be a function of the intensity of the elastic wave field.

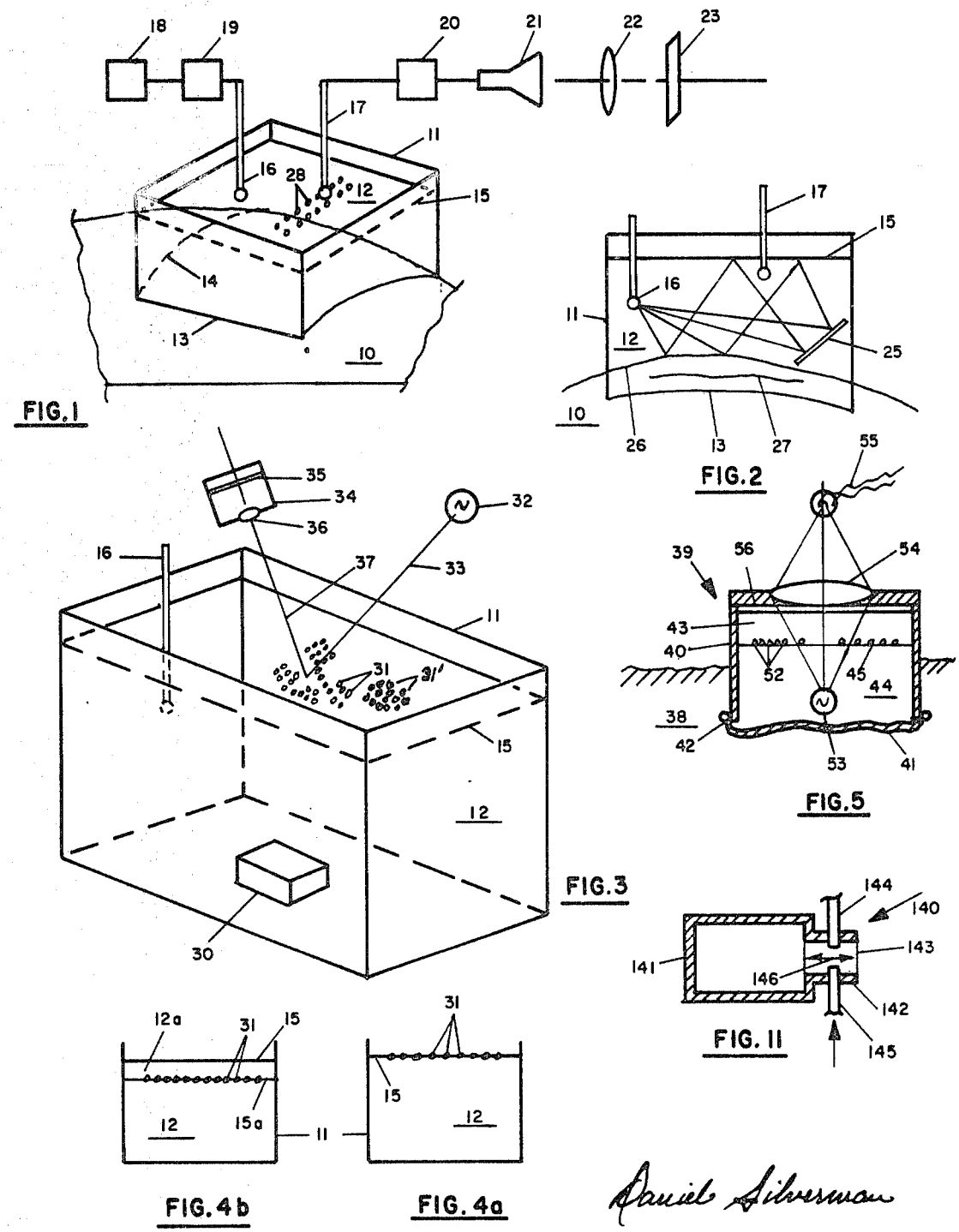

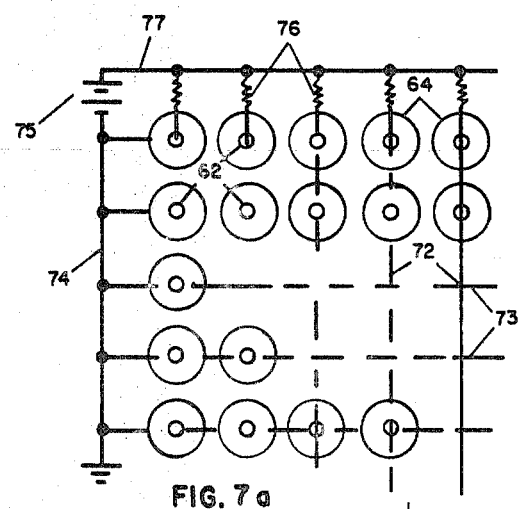
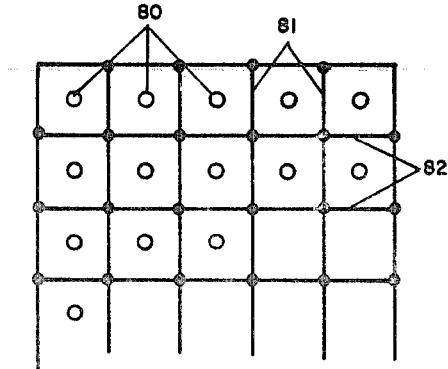
FIG. 7a
FIG. 7b
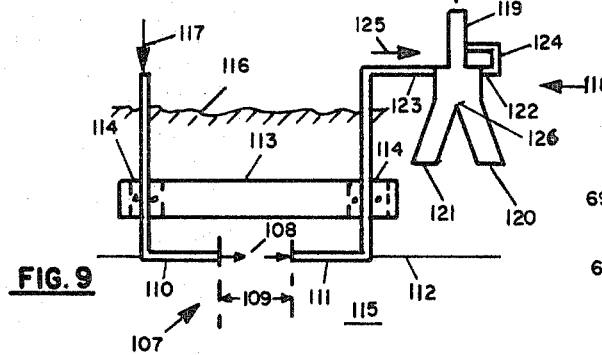
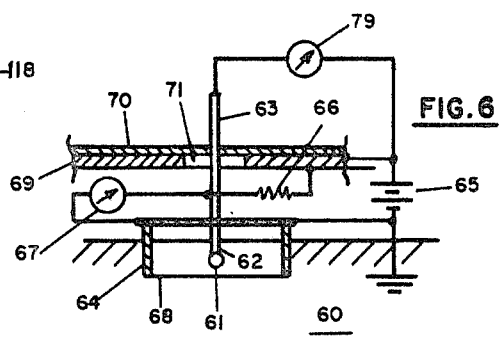
FIG. 9
FIG. 6
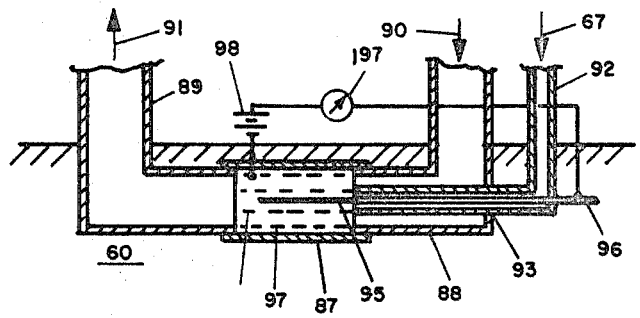
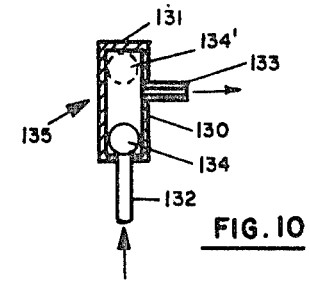
FIG. 8
FIG. 10
David Silverman
INVENTOR.
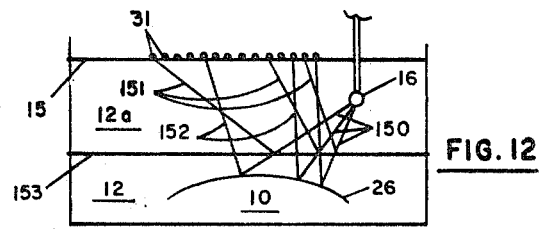
FIG. 12

METHOD AND APPARATUS FOR DETECTING COHERENT ELASTIC WAVE ENERGY

This application is a continuation-in-part of my copending application Ser. No. 512,689, entitled: Wavelet Reconstruction Process for Sonic, Seismic and Radar Exploration, filed Dec. 9, 1965, now U.S. Pat. No. 3,400,363.

This invention relates to the nondestructive testing and mapping of single or multilayered systems of elastic wave propagating media. While this invention can be used for any type or size of solid or liquid system, it is particularly useful for exploring and mapping interfaces between organs in human or animal bodies. This invention is further directed to methods of and apparatus for detecting and measuring the intensity of elastic wave energy in a standing wave coherent elastic wave field.

This invention utilizes the principles of optical holography. In this process, a surface is irradiated with coherent luminous radiation of a specific frequency. The luminous radiation is reflected and diffracted from the surface and is received at a photographic plate. In addition, part of the energy from the luminous source is reflected directly to the receiving photographic plate where it combines with the radiation reaching the film from the surface. The combined radiation is then recorded on the film. The film is developed and is a hologram. This film can be irradiated with coherent luminous radiation, and the light will be diffracted by the holographic plate and will form an image of the original irradiated surface.

In my copending application, Ser. No. 512,689, entitled, "Wavelet Reconstruction Process for Sonic, Seismic, and Radar Exploration," filed Dec. 9, 1965, I describe sonic or seismic holographic systems. In that application I show how a source of coherent elastic wave energy can be used to irradiate (for example) a solid surface immersed in a liquid. The elastic wave energy is reflected and diffracted from the solid surface to a receiving array comprising an array of elastic wave receivers. Part of the original radiation (or a second source of radiation of the same frequency) is used to also irradiate the receivers. The outputs of the receivers are amplified and recorded in the form of spots of selected optical properties. The positions of the spots on the record correspond to the positions of the corresponding receivers in the receiving array. This record is a hologram. It, or a reduced size transparency copy can be viewed in coherent illumination to display the original irradiated reflecting and diffracting surface.

This present invention is an extension of the invention in Ser. No. 512,689, and is concerned particularly with improved methods of and apparatus for detecting receiving and recording the elastic wave energy at the receiving points in the receiving plane or receiving surface. This invention is applicable to the measurement of elastic wave energy in fluid media, either gas or liquid, and solid media for holographic or other purposes where the elastic wave field is a coherent steady state field or standing wave field.

The conventional method of recording elastic wave energy is by the use of transducer instruments which are placed in or on the wave-transmitting medium and respond to the displacement, velocity, or acceleration of the particles of which the medium is composed, or the pressure within the medium.

These instruments normally generate small electrical voltages which must be amplified before being recorded. This requires a large amount of expensive equipment, particularly since many detecting points must be provided in the receiver array.

Since the particles of the transmitting medium must move to transmit the wave motion, this invention makes use of this particle motion to redistribute a volume of detecting material placed in predistributed form in or on the medium. Due to the wave motion, the particles of the medium, as they move, will move and reposition the detecting material. Where the particle motion is greatest the repositioning will be greatest, and where the wave motion is least, the repositioning will be least.

For example, consider a liquid medium with the receiving material in a fine powder capable of floating on the liquid surface, distributed more or less uniformly over the surface. Where the particle motion is very low, the material will not move appreciably. Where the particle motion is very high, the powder will be moved. In general, the powder will move laterally toward and will accumulate at points of small particle motion and will move laterally away from points of large particle motion. If the particles have a different optical property from the liquid medium, a photograph of the surface will show the resulting distribution of the material.

Instead of a receiving material being solid, such as powders, particles, or encapsulated materials, it may be a liquid of properties contrasting with those of the liquid medium in which it is placed. Thus a small drop of salt water placed at a point on the surface of a quiescent body of fresh water will stay essentially fixed, although, it will start to slowly diffuse through the water. However, if an elastic wave should move past the point, the resulting motion of the water particles will cause some turbulence and mixing of the salt water and the water of the medium causing a more rapid movement of the salt water away from the point. This movement can be detected electrically.

The receiving material can be a water-soluble dye of contrasting color to that of the water of the medium or a fluorescent dye, for example. Then the resulting distribution of the dye can be observed optically or photographed for a record, and so on.

The principle object of this invention, therefore, is to provide a simple, cheap, and easily handled detecting means to detect, measure, and/or record the steady state standing elastic wave energy field in an elastic wave energy transmitting medium.

Still other objects and details of this invention will become evident in connection with the following drawings and description of a number of embodiments of my invention in which:

FIG. 1 and 2 illustrate schematically one embodiment of this invention in which conventional transducer devices are used to initiate and detect the elastic wave energy.

FIGS. 3, 4a, and 4b illustrate the application to this type of system the use of one type of detecting system employing a particulate material.

FIG. 5 illustrates a modification of the system of FIG. 3.

FIG. 6 illustrates a type of detector in which the detecting material is a liquid in a liquid medium.

FIGS. 7a and 7b illustrate two types of arrays of detectors of the type illustrated in FIG. 6.

FIG. 8 illustrates schematically another embodiment in which the detecting material is a liquid flowing in conjunction with a second liquid with which it is miscible.

FIG. 9 illustrates schematically an embodiment in which detecting material is a liquid of the same nature as the liquid of which the medium is constituted.

FIG. 10 illustrates a type of indicator useful in connection with the system of FIG. 9.

FIG. 11 illustrates a method of creating a frequency-sensitive detector system employing the principles of FIGS. 6, 8, and 9, etc.

FIG. 12 illustrates an embodiment in which two liquid media are used and the interface between them becomes a reflector means for holographic purposes.

In FIG. 1, I show a method of recording a hologram of a solid surface submerged in a liquid medium. This surface can be the exterior surface (or an interior surface) of a human or animal body, or other solid or liquid single or multielement system. The portion of the body 10 to be mapped is placed in contact with a layer of liquid 12 within an enclosure 11. This can be a fencelike enclosure resting on top of the body, sealed along edges 13, 14, for example. Or the body or the part of it to be examined, can be immersed in a tank of liquid, such as water. The liquid can be below, to the side of, or above the body, In FIG. 1, the water overlays the body and the surface of the water is shown at 15.

A transducer 16 is supplied with electric power of a constant frequency, $f$, from an oscillator 18 through amplifier 19. This sets up an elastic wave field (EWF) in the water. As shown in FIG. 2, which is a side elevation of FIG. 1, part of this elastic wave energy (EWE) is reflected by reflecting surface 25 to the surface 15 of the water. Part of the EWE from transducer 16 is directed to the outer surface 26 of the body 10 and is reflected and diffracted, or otherwise redirected, to the surface of the liquid 15, where it combines with the EWE from reflector 25 to provide a resulting steady state EWF at the surface.

This field can be explored by a conventional transducer 17 immersed in the liquid 12 near the surface 15. It is connected to an amplifier 20 and cathode ray tube (CRT) 21 where the beam spot is brightened in accordance with the strength of the signal picked up by 17, and thus proportional to the intensity of the EWF at the point where the transducer is positioned. The transducer is adapted to be moved to a plurality of points 28 in an array in the receiving surface. At the same time, by means not shown but well know, the spot on the CRT is made to move in a corresponding array. The resulting pattern of spots on the face of the CRT is imaged by lens 22 onto a photographic plate or film 23. The developed plate 23 is a hologram of the surface 26.

It is time consuming to reposition the receiving transducer to a plurality of points 28. So a plurality of transducers 17 could be positioned, one at each of the points 28, each connected to an amplifier and to an optical transducer, and so on. However, this invention provides a much simpler, faster, and cheaper method of making a record of the EWF at the receiving surface.

This is illustrated in fIG. 3. This shows a tank 11 with water 12, to level 15 and a three-dimensional object 30 immersed in the water. The transducer 16 irradiates the surface of object 30 with coherent EWE. In addition, there is a reflector surface, like 25 of FIG. 2, (not shown) that reflects part of the EWE from 16 up to the surface. At the surface 15 of the liquid 12 the two sets of coherent waves combine to form a resultant steady state standing wave EWF.

A material, such as a fine powder, like lycopodium powder, for example, or other fine particulate matter 31 of less density than water, is spread over the surface 15, in a more or less uniform distribution. The actual distribution is not too critical, as will be seen.

When an EWF is set up in the liquid (water) it is transmitted by the movement of particles of the water under the influence of the EWF. At the surface, the particle motion of the water will be greatest where the intensity of the EWF steady state standing wave pattern is greatest. And the particle motion will be least where the amplitude or intensity of the EWF is least. Where the particle motion of the water is high, the powder floating on the surface will be disturbed by the water particle motion and will move laterally to positions of lower intensity of motion. Thus, after a suitable period of time, which would be probably quite short, the powder will accumulate in those parts of the surface where the intensity is least, and there will be little or no powder where the intensity of the particle motion is highest. The resulting pattern or state of distribution of the powder 31 over the surface after the passage of the EWE can be recorded by means of a camera 34 with lens 36 and film 35. The surface 15 can be illuminated by lamp 32. Of course, the optical properties of the powder and of the liquid must be different so that the resulting photograph will have areas of contrasting density corresponding to the areas of powder and liquid. This photograph is a hologram of the surface of object 30, and an image of the surface can be reconstructed by the well-known methods of optical holography.

Instead of a naturally occurring powder or fine seed, it is possible to grind a solid material of low density such as cork, for example. The size of the particles should be small compared to the wavelength of the EWE in the liquid. For long wavelengths, the particles could be larger, for example, ping-pong balls, or the like.

If a plane wave of EWE intersects surface 15 at a large angle, the nodes and antinodes, or points of low and high particle motion, will be in the form of parallel lines, separated by a distance of somewhat less than the wavelength. Thus, to accurately map this EWF, it is necessary that the points at which measurement of the EWF intensity are made be spaced at distances of less than a wavelength and preferably less than one-half wavelength.

In FIG. 4a, I show how in the case of a single liquid medium 12 in a container 11, the powder 31 can be supported on the free surface 15. In FIG. 4b, I show how a double liquid system can be used in which a less dense liquid 12a overlies the liquid 12 in which the object is immersed. The powder can be placed on the free surface 15 or the intermediate surface 15a between liquids 12 and 12a.

In the case of very high frequency waves in a liquid medium, (that is, very small wavelength) the entire holographic picture, covering many wavelengths in each direction, can be indicated on a water surface of relatively small area. However, with low frequencies, such as in sonic signalling in water, the wavelength may be many tens of feet and the entire surface of interest may be hundreds or thousands of feet across. In such a case it would be difficult to examine or photograph such a large surface at one time. However, it is possible to map the large surface by providing a matrix of "point" indicators. Each of these indicators will indicate a function of the intensity of the EWF over local areas surrounding the points.

FIG. 5 illustrates one type of indicator. It comprises a container 40 with open bottom covered by a thin flexible membrane 41, fastened by means 42. The top 50 is transparent and sealed. The indicator can be immersed partially or totally in the medium. There is an air space 43 above the liquid 44, with a free surface 45. The liquid 44 can be the same as or different from the medium 38. The powder 52 is on the free surface and is originally placed in substantially uniform spacing on the surface. If the device 39 is put into the EWF in the medium at a point which is an antinode, the powder will be driven away, that is, driven toward the walls of the container 40 and the center will be substantially clear. On the other hand, if the device 39 is placed at a node in the medium, there will be little or no tendency for the powder to move at all, and its distribution will not change appreciably. At intermediate points in the EWF the action will be intermediate.

These conditions can be determined by manually viewing, or by photographic or photoelectric means. This can be done by means of lamp 53, and PE cell 55. The change in light transmission through the layer of opaque powder on the liquid will be indicative of the action of the powder, and thus of the intensity of EWE at the point of placement of the device 39.

The material that is placed in or on the EWE medium can be a solid in finely divided form, or it can be fine droplets of liquid immiscible with the liquid of the medium, such as a fine mist of oil (in a water medium). It can also be minute capsules of a liquid in a solid encapsulation. These would act essentially as the powder described in connection with FIGS. 3, 4, and 5. The material can also be a solid material which is slowly soluble in the liquid medium. The rate of solution will be a function of the intensity of the EWE.

If the material is a layer of fine droplets of oil, for example, floating on the water, the action of the EWE reaching the receiving surface (or receiving plane) might be to cause the droplets to coalesce into larger droplets. The extent of this action would be a function of intensity of the EWF. The nature of the distribution of the material, such as fine droplets, larger droplets, or very large droplets, etc., would be indicative of the intensity of the EWF.

There is another form in which an indicator material can be used. This is illustrated in FIG. 6. The medium 60 can be a liquid such as water. A probe 62 is arranged (either by means of a hollow conduit, or small reservoir 61) to hold a miscible liquid of differing physiochemical properties than the liquid 60. This can be a conductive liquid, for example, or a colored or opaque dye, etc. Consider that the reservoir 61 holds a conductive liquid such as a salt solution. The screen or barrier 64 can be a conductive shell or wire, etc., surrounding the probe. A battery 65 and resistor 66 are connected between the probe and the barrier. A potential indicator 67 is also connected between the probe and the barrier.

At the start, when a droplet of liquid is placed by the probe 62 into the liquid 60 at point 61, nothing happens. There is an open circuit between the probe and the barrier, and the indicator 67 will show the potential of the battery 65. The salt solution will begin to diffuse through the liquid 60 toward the barrier. However, this is a very slow process. On the other hand, a high intensity of EWE in the area of the probe will cause turbulence in the liquid and mixing of the liquid 60 and the salt solution. Therefore, very quickly the conductive salt solution will reach the barrier, and the potential of the probe (with respect to the barrier) will drop to a value indicative of the relative values of resistor 66 and the resistance of the path between 61 and 64. This potential will be a measure of the EWF intensity.

The system shown in FIG. 6 is adaptable to a multiple array such as shown in FIGS. 7a and 7b. Multiple probes 62 and barriers 64 are placed in a two-dimensional matrix of rows 73 and columns 72. The barriers can be cylinders of perforated metal or screen. Or they can be formed of interconnecting sets of wires in rows and columns 82 and 81. Screen or hardware cloth could be used for this purpose. These would be grounded together 74 and connected to a battery 75. The other pole of the battery would be connected through resistors 76 to the probes 62.

The barriers 64 or wires 81, 82, can be mounted to an insulated frame, which also holds the probes. This framework is not shown but would be known to one skilled in the art.

The indicators, like 67, can be manually read. Or the voltage between probes and barriers can be recorded by multielement oscillographs or records. Or the voltages can be multiplexed and recorded. Or they can be recorded directly as shown in FIG. 6. Here a metal plate 69 is mounted above the probe and barrier. It is connected to the ungrounded pole of the battery 65. The potential between probe 62 and plate 69 is the potential across the resistor, which is zero until there is conductivity between probe and barrier. The sum of indicator voltages 67 and 79 is, of course, the battery potential. So as indicator 67 voltage drops, the voltage of 79 will rise.

An electrographic sheet 70, such as facsimile paper, etc., is placed on top of plate 69. The probe 62 pierces the sheet (and therefore is electrically connected to it). The plate 69 has an opening 71 surrounding the probe. So the sheet experiences the potential between probe and battery. The darkening of the sheet 70 due to this potential, is a measure of the potential and thus of the intensity of the EWF. The plate 69 and sheet 71 can, of course, be adapted to the matrix of FIG. 7. In such a case, the sheet would show a pattern of dark and light patches. It, or a reduced size transparency of this sheet would be a hologram of the EWF at the surface of the irradiated object.

The receiving surface is the surface defined by the array of probes and barriers or screens. This can be a plane, horizontal or tilted, or it can be a curved surface.

If the receiving material is a dye miscible with the medium liquid, this droplet of dye will remain at the location of the probe. However, when the EWE reaches the receiving surface, the turbulence causes mixing of the dye and the water. The spreading of the color, that is, the radius of the dye patch, as a function of time, is a measure of the intensity of the EWF. A photograph of the dye patches will be a hologram. A succession of photographs can be taken at increasing time intervals, and the progress of the dye noted as a measure of the EWF intensity. The action of the mixing is progressive. In other words, the total mixing and spread of the dye is, in effect, a time integration of the particle motion of the liquid. Thus, this method can be utilized for recording weak EWF.

If desired, a photoelectric system such as shown in FIG. 5, can be used with an opaque dye to record the progress of the mixing and dispersion of the dye.

The assembly of probe 61 and barrier 64 of FIG. 6 could, of course, be adapted to the assembly of FIG. 5, for example. The wall 40 would correspond to the barrier, and the probe would be mounted in the center of the container. The use of the membrane 41 (for transmission of the wave motion) would permit using a liquid of different properties 44 inside the device 39 than the liquid of the medium 38. The presence of the membrane and closed container 44 isolates the detection or receiving material against constant flow currents in the medium 38.

There is another form in which the material can be applied to the medium. This is shown in FIG. 8. Here, I use a short length 87 of thin flexible tubing. It is supported by spaced pipes 88, 89, held in fixed relative position by means not shown. A nonconducting liquid is flowed into pipe 88, through tubing 87 and out of pipe 89. The rate at which this liquid flows is such as to cause streamlined flow in 87. A separate small pipe 92 passes through pipe 88 at 93 and is positioned along the axis of tubing 87. A conducting wire 96 is passed through pipe 92 and extends 95 along the axis. A screen or nonconducting surface is placed on or near the inner surface of the tubing 87. A battery 98 and indicator 197 are connected between wire 95 and screen 97.

As the receiving material, salt water, for example, flows into 92 while fresh water flows into 90, a streamlined flow occurs with a central core of conducting water in a flowing column of nonconducting water. If there is no turbulence there will be substantially no conductivity between wire 95 and screen 97 and no current through indicator 197. However, if this assembly is immersed in an EWF in the medium 60, the particle motion in the medium will be communicated through the tubing 87 to the liquid therein. This will cause a turbulent flow and mixing of the salt and fresh water and conductivity between wire and screen. This mixing will be a function of the diameter and length of the tubing 87, the length of wire 95, the flow rate of liquid and receiving material, the length of pulse of receiving material, and the intensity of the EWF. By control of these variables an indication of the function of the intensity of the EWF can be had. If the liquid 90 and medium 60 are both nonconducting, it would not be necessary to use the flexible plastic tube 87.

Multiple units like that in FIG. 8 can be used in an array as in FIG. 7. This assembly or array of units like FIG. 8 can be placed in a plane or curved receiving surface, in any position or attitude within the EWE transmitting medium. If a dye solution is used in pipe 92, the mixing of dye and liquid can be observed or recorded optically. The tubing 87 can, of course, be a circular or rectangular cross section channel (between two parallel plastic surfaces). Other materials and physiochemical properties can, of course, be used. Also, the flow of liquids into pipes 88 and 92 (90, 67) can be controlled from a pipe manifold by means of flow resistance pressure dropping units such as fine bore tubes or orifices, not shown, but well known in the art.

In FIG. 9, I show another type of fluid turbulence detector that can be used to indicate the presence and/or intensity of EWE at a point in a fluid. While any fluid medium can be used, that is, gas, or liquid, its operation will be described in terms of a liquid such as water. It comprises a pair of fine tubes 110, 111, which are held in rigid relative position so that they are exactly coaxial 112 and spaced apart a distance 109. They can be held by means such as bracket 113 with clamps 114. The assembly is placed with the gap at point 108 in medium 115 at the desired depth.

Water is introduced under pressure at 117 and flows along the axis 112 from tube 110 to tube 111 and creates a flow 125 out of 111 at 123. The flow must be at such a rate that it is streamlined from 110 to 111. If the flow is turbulent, the amount of flow reaching 123 will be reduced. Also, if some outside disturbance such as an EWF should flow across point 108, and if it is of sufficient intensity, it will cause a streamlined flow from 110 to 111 to become turbulent. Thus, the flow 125 at 123 will become less, and this reduction in flow is an indication of the EWF.

I show a fluidic amplifier 118 comprising a chamber 126, fluid input 119, outputs 120 and 121 and control inputs 122, 123. Some of the input fluid from 119 is bypassed 124 to 122. This causes the stream of liquid (in this case, water) from 119 to flow out leg 121. When water flows in tube 110 at 117 and in streamlined flow from 110 into 111 and 123, then, if this control flow is greater than the control flow at 122, the stream will switch from 121 over to and flow out of leg 120.

So long as conditions at 108 remain streamlined, the flow from 119 will go to leg 120. However, if anything should disturb the flow at 108 and make it turbulent (such as by EWE), then the flow at 123 will be reduced and the flow from 119 will switch to leg 121. This switch from 120 to 121 is an on-off indicator of energy intensity in the EWF at 108. Of course, the output of fluidic amplifier 118 can be used to drive other stages of fluidic amplifier. Or the output of 118 can be used to control a relay to make an electrical circuit or it can be used to drive a fluidic indicator.

One useful type of indicator is shown in FIG. 10. It comprises a small-diameter tube 130 closed off at top with a transparent wall. Input pipe at bottom 132 comes from one of the legs 120 or 121. A colored ball 134, which is a close, but not tight, fit into the tube is placed inside the tube. When fluid enters the tube at 132 the ball is raised to the top, shown dotted as position 134', where it can readily be seen through the window 131. A fluid output 133 with some flow resistance, provides a means for fluid bypass. When the flow at 132 stops, the ball drops back. The ball could also be a short cylinder or plunger. The indicator can be tied to either leg 120 or 121, since when flow in one leg stops, it starts in the other, and vice versa.

A plurality of turbulence indicators 107 can be used with fluidic amplifiers 118 and flow indicators 135. The turbulence indicators 107 would be placed in a matrix array. The flow indicators 135 would be in a congruent array. A photograph of the array of flow indicators in a closely packed array would show a pattern of contrasting patches. This would be a hologram of the submerged surface sending reflections and diffractions to 107 from a coherent source of EWE. If the flow in pipe 123 is great enough the indicator 135 could be connected directly to 123 instead of through amplifier 118.

In FIG. 9, I show a liquid jet from pipe 110 impinging on pipe 111. If the liquid medium in which the pipes are immersed is quiescent, the jet flow will be streamlined along the axis of the pipes 110, 111. However, if there is particle motion in the liquid due to elastic wave motion, this jet flow will be disturbed. A constant current in the liquid (a DC signal) or a fluctuating motion (an AC signal) will both disturb the jet.

Since the EWE in holography is a constant frequency AC signal, I find it advantageous to make my detector system, the pipes 110, 111, and other apparatus of FIG. 9, sensitive only to alternating particle motion of a predetermined frequency, which is that of the EWF. I do this by placing the jet transverse to the axis of a Helmholtz resonator 140, FIG. 11. The pipes 144, 145, are placed in the neck 142, where the motion of the liquid is in the direction of the axis 146 of the neck of the resonator. The amplitude of the pulsation of liquid in the neck of the resonator is, of course a function of the EWF and its frequency. When the frequency of the signal is the same as the resonant frequency of the cavity, there will be a maximum response and a maximum sensitivity of the detector. When the frequencies are different, there will be a minimum of sensitivity. This is, of course, ideal since we are using a constant-frequency signal to irradiate the hidden surface and the tuned detector tends to discriminate against noise, that is, any particle motion in the liquid of different frequencies due to any other sources.

When there is particle motion in the liquid in which the resonator detector 140 is immersed, the oscillatory particle motion in the neck 142 will cause turbulence and will break up the streamlined motion of the jet from 145 to 144. The sensitivity of this detector is a function of the diameter of the pipes 145, 144 and their spacing. The shorter the spacing, the more stable the jet and the less sensitive the detector, and so on. The sensitivity also depends on the design of the resonator, in the sense of the amplitude of oscillation of the liquid in the neck. This art is well known.

While I have shown in the resonator 140 of FIG. 11 the detecting means of FIG. 9, it is equally possible to apply to this resonator system other types of detectors, such as those shown in FIGS. 6 and 8, for example, and others. Also, the systems of FIG. 11, and FIG. 9, while described in terms of a liquid medium, could equally well be used in a gaseous medium.

In FIG. 3, I show a pattern of particles 31 on the liquid surface 15, and a lamp 32 to illuminate the surface and a camera 34 or other device to record the pattern of the patches of material. This photograph is a hologram of the irradiated submerged surface. However, the surface 15, with material 31, forming a pattern of light, shade, or color, is also a hologram. Thus, by substituting a coherent beam of light in place of lamp 32 to illuminate the surface 15, and by placing the camera 34 in the proper position, as is well known in optical holography, the camera will photograph a reconstructed image of the hidden surface. This same technique can also be used with the sheet 70 of FIG. 6 and other similar embodiments.

In FIG. 4b, I show an embodiment in which a body might be submerged in a first liquid 12, with a second liquid 12a of less density placed above the liquid 12. The detecting material can be placed in the interface between the two liquids, or on the surface of the upper liquid. In FIG. 12, I show a further modification of this embodiment in which the material 31 is placed on the surface of liquid 12a. The source of coherent elastic wave energy 16 is immersed in the top liquid 12a and by means of rays illustrated schematically as 150 irradiates the upper surface 26 of body 10 placed in the lower medium 12. Some of these rays 150 will be reflected upwardly by interface 153, as rays 151 to the surface and the array of detecting material 31. Others of the rays will project into the second medium 12 and to the body and be reflected from the surface 26, and thence upwardly as 152 to the surface 15. If the interface 153 between the two liquids is a plane surface (that is, without substantial ripples, etc.) the rays reflected upwardly will serve as a biasing EWF, similar to that provided by means of reflector 25 of FIG. 2. Thus, the combination of the two EWF, that reflected from the interface 153 and that from the surface 26 will combine to form a combination EWF at the surface 15 that will change the state of distribution of the material 31 to form a hologram of the submerged surface 26.

In my copending application, Ser. No. 512,689, I show, in FIG. 8 therein, how it is possible to use two separate areas or patches of receivers, with corresponding means to make two areas or patches of luminous spots and two resulting holograms. The two records or holograms would correspond to the two separated receiving areas, and would, when the wavefronts were reconstructed, show two images of the hidden surface as seen from two different angles. These two images would form a stereo-optical pair, and by well-known means, could be used to determine size and position of the hidden surface with respect to the geometry of the two receiving areas and the optical system.

In this invention, I plan to incorporate the same feature. For example, in FIG. 3, I propose the use of two separated receiving surfaces with receiving material distributed as two separated patches 31, 31' in the receiving surfaces. The camera 34 would then be used to record the state of distribution of the receiving material in these two patches 31, 31' on the surface 15 of the liquid. The two resulting photographs or holograms would then (when properly irradiated with coherent illumination) form two images of the body 30, and photographs of these images would form the desired stereo pair.

While I call for two separate sources of coherent elastic wave energy of the same frequency, these can comprise, as shown in FIGS. 2 and 12, one transducer source 16 and a reflector source 25 and 153, respectively, or it can comprise two separate transducer sources as shown in my U.S. Pat. No. 3,400,363, FIG. 6, one of which irradiates the object and the other of which irradiates the receiver surface.

While my invention has been described with reference to the foregoing special embodiments and illustrations, it will be apparent to those skilled in the art that the principles of the invention can be employed to accomplish its objects in many further and different ways not disclosed in detail. Also, different language may be used to describe these embodiments. For example, when I speak of "in the medium" or "immersed in the medium," I mean positioned inside the volume of the medium or on an exterior surface of the medium. The scope of the invention should, therefore, not be construed as limited to the embodiments and details described, but it is preferably to be ascertained from the scope of the appended claims.

I claim:

1. Apparatus for detecting interfering coherent elastic wave energy in an elastic wave transmitting medium, comprising:
   a. a detecting material,
   b. means for distributing said detecting material in a predetermined manner in the vicinity of at least one point in a receiving surface in said medium,
   c. The state of distribution of said detecting material in said medium adapted to be changed by the physical lateral movement of said material due to the movement of the particles of said medium as the result of a coherent standing elastic wave pattern at said receiving surface,
   d. means for initiating the irradiation of said at least one point with coherent elastic wave energy of a frequency $f$ from a first source thereof,
   e. means for initiating the irradiation of said at least one point with coherent elastic wave energy of frequency $f$ from a second source thereof, whereby a steady state standing wave pattern of coherent elastic wave motion is set up in the vicinity of said first point, and
   f. means for detecting a function of the state of distribution of said material at said at least one point after the initiation of said irradiations.

2. Apparatus as in claim 1 in which said medium is a first liquid, and said material is a second liquid.

3. Apparatus as in claim 1 which said state of distribution of said material is static.

4. Apparatus as in claim 1 in which said state of distribution of said material is dynamic.

5. Apparatus as in claim 1 in which said receiving surface is a plane surface.

6. Apparatus as in claim 5 in which said medium is a solid, said receiving surface is an external surface of said medium, and said material is positioned on said external surface of said medium.

7. Apparatus as in claim 1, in which said means for initiating irradiation comprises a source of coherent elastic wave energy of a frequency $f$ irradiating a second surface immersed in said medium, said second surface adapted to redirect to said at least one point part of the coherent elastic wave energy it receives.

8. Apparatus as in claim 7 including also the direct irradiation of said at least one point by coherent elastic wave energy of frequency $f$.

9. Apparatus as in claim 1 in which said material is a particulate material.

10. Apparatus as in claim 9 in which said means to detect a function of the state of distribution of said material comprises a material of optical properties contrasting with the optical properties of said medium and means to photograph said receiving surface with said material thereon.

11. Apparatus as in claim 2 in which said second liquid is a conducting liquid and said medium is a nonconducting liquid and said means to detect a function of the state of distribution of said material comprises means for measuring a function of the conductivity of said medium in the vicinity of said at least one point in said receiving surface.

12. Apparatus as in claim 11 in which the means to measure said function of the conductivity of said medium comprises means for applying an electrical potential to said at least one point and means for measuring a function of the current flowing from said point to an adjacent conductor in said medium.

13. Apparatus as in claim 12 in which said function of said current is recorded by electrographic means.

14. Apparatus as in claim 2 in which said second liquid is a dye of contrasting optical properties to those of said first liquid.

15. Apparatus as in claim 14 in which the function of the state of distribution of said second liquid is measured by optical means.

16. Apparatus as in claim 2 in which said second liquid is in dynamic streamlined flow inside said first liquid prior to the initiation of irradiation by elastic wave energy and in turbulent flow after said initiation of irradiation.

17. Apparatus as in claim 1 including at least one resonant cavity tuned to the frequency of said elastic wave energy placed at said at least one point.

18. In a coherent elastic wave apparatus in which a source of coherent elastic waves irradiates a hidden object surface submerged in a first elastic wave transmitting medium, and in which elastic waves redirected by said hidden object surface are received by a receiver system arrayed in a receiving surface in a second elastic wave transmitting medium in elastic wave transmitting contact with said first medium and with said hidden object surface, the improvement comprising,
   a receiver material, said material positioned in a predetermined distributed array in said receiving surface,
   the state of distribution of said material adapted to be changed by the physical lateral movement of said material due to the movement of the particles of said second medium in which said array is positioned as the result of a coherent elastic steady state standing wave pattern at said receiving surface,
   means to initiate the irradiation of said hidden object surface with coherent elastic wave energy of frequency $f$ from a first source thereof at least part of which is redirected to said receiving surface,
   means to initiate the irradiation of said receiving surface with coherent elastic wave energy of frequency $f$ from a second source thereof, whereby a steady state standing elastic wave pattern is formed at said receiving surface, and
   means to detect a function of the state of distribution of said material over said receiving surface after the initiation of said two irradiations.

19. Apparatus as in claim 18 in which said means to irradiate said receiving surface comprises a separate means from the means which irradiates said hidden object surface.

20. Apparatus as in claim 18 in which the same means is used to simultaneously irradiate both said receiving surface and said hidden object surface.

21. Apparatus as in claim 18 in which both said first medium and a second medium in contact with said first medium are liquids.

22. Apparatus as in claim 21 in which said receiving surface is in the interface between said first medium and said second medium.

23. Apparatus as in claim 21 in which said receiving surface is in said second medium.

24. Apparatus as in claim 17 in which said first medium is a solid, said second medium is a liquid in contact with said solid and said receiving surface is in said liquid.

25. Apparatus as in claim 17 in which said array comprises a two-dimensional matrix of spaced detecting points.

26. Apparatus as in claim 25 in which the spacing between said points is less than one wavelength of said elastic waves in said medium.

27. Apparatus as in claim 25 in which the spacing between said points is less than one-half wavelength of said elastic waves in said medium.

28. Apparatus as in claim 18 in which said predetermined distributed array in which said material is positioned in said receiving surface includes at least two spaced patches of material.

29. In a coherent elastic wave apparatus in which a first source of coherent elastic wave energy of frequency $f$ irradiates a first surface submerged in a first elastic wave transmitting medium and in which elastic waves redirected by said first surface are received in part by a receiver system arrayed in a receiver surface in an elastic wave transmitting medium in elastic wave transmitting contact with said first surface, and a second source of coherent elastic wave energy of frequency $f$ irradiates said receiver surface, the method of detecting the coherent elastic standing wave pattern formed at said receiver surface comprising the steps of,
   a. placing a receiver material in a predetermined distribution over at least part of said receiver surface, the state of distribution of said material adapted to be changed by the physical lateral movement of said material due to the movement of the particles of said medium in which said material is positioned as the result of a coherent elastic standing wave pattern at said receiving surface,
   b. irradiating said first surface by said first source whereby part of the energy received by said first surface will be redirected to said receiver surface,
   c. irradiating said receiver surface by said second source, whereby said standing wave pattern will be set up, and
   d. detecting a second state of distribution of said receiver material in said receiver surface after said irradiations.

30. The method of claim 29 in which a single transducer of coherent elastic wave energy provides both said first and said second sources of coherent radiation.

31. The method as in claim 29 including the step of making a record of said second state of distribution of said receiver material in said receiver surface.

32. The method as in claim 31 including the steps of making a reduced size transparency of said record and irradiating said transparency with coherent luminous radiation, whereby an image of said first surface will be reconstructed.

33. The method as in claim 29 including the step of irradiating said second state of distribution of said receiver material in said receiver surface with coherent luminous radiation, whereby an image of said first surface will be reconstructed.

34. The method as in claim 29 in which said step of placing said receiver material comprises placing said material in at least two spaced patches in said receiver surface.